(12) United States Patent
Hakura et al.

(10) Patent No.: US 7,260,686 B2
(45) Date of Patent: Aug. 21, 2007

(54) SYSTEM, APPARATUS AND METHOD FOR PERFORMING LOOK-AHEAD LOOKUP ON PREDICTIVE INFORMATION IN A CACHE MEMORY

(75) Inventors: Ziyad S. Hakura, Mountain View, CA (US); Radoslav Danilak, Santa Clara, CA (US); Brad W. Simeral, San Francisco, CA (US); Brian Keith Langendorf, Benicia, CA (US); Stefano A. Pescador, Sunnyvale, CA (US); Dmitry Vyshetsky, Cupertino, CA (US)

(73) Assignee: Nvidia Corporation, Santa Clara, CA (US)

( * ) Notice: Subject to any disclaimer, the term of this patent is extended or adjusted under 35 U.S.C. 154(b) by 308 days.

(21) Appl. No.: 10/920,995

(22) Filed: Aug. 17, 2004

(65) Prior Publication Data

US 2006/0041722 A1 Feb. 23, 2006

(51) Int. Cl.
*G06F 12/00* (2006.01)
(52) U.S. Cl. .................................................. 711/137
(58) Field of Classification Search ................ 711/137
See application file for complete search history.

(56) References Cited

U.S. PATENT DOCUMENTS

| | | | |
|---|---|---|---|
| 5,802,559 A * | 9/1998 | Bailey | 711/118 |
| 5,802,561 A * | 9/1998 | Fava et al. | 711/120 |
| 6,105,111 A * | 8/2000 | Hammarlund et al. | 711/136 |
| 6,243,791 B1 * | 6/2001 | Vondran, Jr. | 711/120 |
| 6,275,902 B1 * | 8/2001 | Hotta et al. | 711/129 |
| 6,490,658 B1 * | 12/2002 | Ahmed et al. | 711/140 |
| 6,571,315 B2 * | 5/2003 | Campbell | 711/120 |
| 2003/0115021 A1 * | 6/2003 | Mates | 702/186 |
| 2004/0186960 A1 * | 9/2004 | Poggio | 711/137 |

OTHER PUBLICATIONS

Callahan, David. "Software Prefetching" ACM SIGARCH Computer Architecture News. Apr. 1991. vol. 19, Issue 2. pp. 40-52.*
U.S. Appl. No. 09/791,417, filed Feb. 23, 2001, Unknown.
U.S. Appl. No. 10/674,618, filed Sep. 29, 2003, Radoslav Danilak.
U.S. Appl. No. 10/712,520, filed Nov. 12, 2003, Radoslav Danilak.

* cited by examiner

*Primary Examiner*—Kevin L. Ellis
*Assistant Examiner*—Shawn Eland
(74) *Attorney, Agent, or Firm*—Cooley Godward Kronish LLP (57) ABSTRACT

A system, apparatus, and method are disclosed for storing predictions as well as examining and using one or more caches for anticipating accesses to a memory. In one embodiment, an exemplary apparatus is a prefetcher for managing predictive accesses with a memory. The prefetcher can include a speculator to generate a range of predictions, and multiple caches. For example, the prefetcher can include a first cache and a second cache to store predictions. An entry of the first cache is addressable by a first representation of an address from the range of predictions, whereas an entry of the second cache is addressable by a second representation of the address. The first and the second representations are compared in parallel against the stored predictions of either the first cache and the second cache, or both.

13 Claims, 8 Drawing Sheets

SYSTEM, APPARATUS AND METHOD FOR PERFORMING LOOK-AHEAD LOOKUP ON PREDICTIVE INFORMATION IN A CACHE MEMORY

BRIEF DESCRIPTION OF THE INVENTION

This invention relates generally to computing systems and their memory, and more particularly, to storing predictions as well as examining and using one or more caches for anticipating accesses to a memory, such as a system memory.

BACKGROUND OF THE INVENTION

Prefetchers are used to fetch program instructions and program data so that a processor can readily avail itself of the retrieved information as it is needed. The prefetcher predicts which instructions and data the processor might use in the future so that the processor need not wait for the instructions or data to be accessed from system memory, which typically operates at a slower rate than the processor. With a prefetcher implemented between a processor and system memory, the processor is less likely to remain idle as it waits for requested data from memory. As such, prefetchers generally improve processor performance.

Generally, the more predictions generated by a prefetcher, the more likely that the prefetcher can arrange to have the necessary instructions and data available for a processor, thereby decreasing the latency of a processor. But many conventional prefetchers lack capabilities to manage predictions after they are generated and before a processor requests those predictions. Usually these prefetchers store prefetch data in a single cache memory, which is typically lacking in functionality to limit predictions that are superfluous with respect to those already stored in the cache. Moreover, cache memories of traditional prefetchers are not sufficiently designed for managing predicted addresses stored therein as they are for merely storing data generally.

In view of the foregoing, it would be desirable to provide a system, an apparatus and a method for minimizing the drawbacks of managing predictive accesses to memory, especially from the time when a prefetcher generates predictions to when a processor requests those predictions.

SUMMARY OF THE INVENTION

A system, apparatus, and method are disclosed for storing predictions as well as examining and using one or more caches for anticipating accesses to a memory. In one embodiment, an exemplary apparatus is a prefetcher for managing predictive accesses with a memory. The prefetcher can include a speculator to generate a range of predictions, and multiple caches. For example, the prefetcher can include a first cache and a second cache to store predictions. An entry of the first cache is addressable by a first representation of an address from the range of predictions, whereas an entry of the second cache is addressable by a second representation of the address. The first and the second representations are compared in parallel against the stored predictions of either the first cache and the second cache, or both. In some cases, the range of predictions includes two or more predictions, such as seven sequential or four nonsequential predictions. In one embodiment, each prediction in the first cache has an age within a first age range and each stored prediction in the second cache each has an age within a second age range. In yet another embodiment, the second cache is configured to store more predictions than the first cache. And in some cases, each second representation is adapted to compare against a larger number of predictions in parallel than each of the first representations being compared against predictions in the first cache. In yet another embodiment, the first cache is configured to copy predictions into the second cache.

In another embodiment, an exemplary data return cache memory manages predictive accesses to a memory. The data return cache memory comprises a short term cache memory configured to store predictions having an age less than a threshold and a long term cache memory configured to store the predictions having an age greater than or equal to the threshold. The long term cache memory typically has more memory capacity than the short term cache. The prefetcher also can include an interface configured to detect in parallel, such as during one cycle of operation or over two cycles, whether multiple predictions are stored in either the short term cache memory or the long term cache memory, or both, wherein the interface uses at least two representations of each of the multiple predictions when examining the short term cache and the long term cache memories.

In yet another embodiment of the present invention, an exemplary method for managing predictions to access a memory is disclosed. This method comprises generating sequential and nonsequential predictions, and examining a subset of those predictions against multiple cache memories. This examination can be performed either simultaneously or nearly simultaneously over the multiple cache memories. The multiple cache memories include at least a short term cache and a long term cache. The method can continue by disregarding a prediction of the subset if the prediction is stored in any of the multiple cache memories. In another embodiment, a method can further comprise copying an unused prediction from the short term cache to the long term cache after a time during which a processor does not request the unused prediction. In yet another embodiment, the copying of the unused prediction in this method further includes storing valid bits of the unused prediction separate from address bits.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF EXEMPLARY EMBODIMENTS

Figure 1:
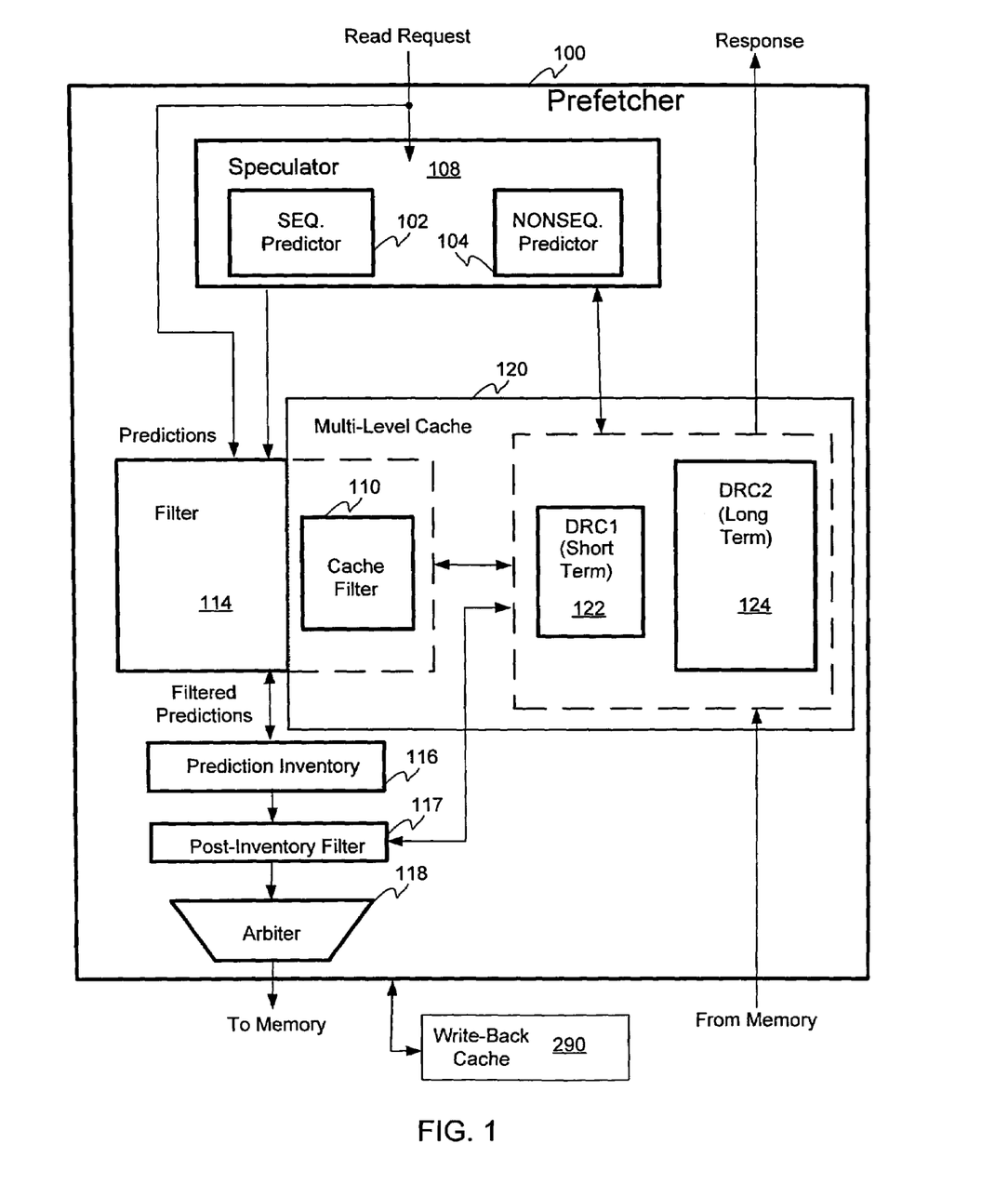
FIG. 1 is a block diagram illustrating a prefetcher that includes an exemplary cache memory, according to a specific embodiment of the present invention.

FIG. 1 is a block diagram illustrating a prefetcher 100 including an exemplary multi-level cache 120, according to a specific embodiment of the present invention. In this example, multi-level cache 120 includes a cache filter 110, a first level data return cache ("DRC1") 122 and a second level data return cache ("DRC2") 124. Cache filter 110 is configured to expeditiously examine, or perform a "look-ahead lookup" on both first level DRC 122 and second level DRC 124 to detect either the presence or the absence of an input address, such as a predicted address, in those caches. A look-ahead lookup is an examination of cache memory to determine, in parallel, whether a number of predictions already exist in, for example, multi-level cache 120.

Depending on whether a prediction is present or absent, multi-level cache 120 manages the contents of both first level DRC 122 and second level DRC 124 in accordance with caching policies, examples of which are described below. First level DRC 122 can be generally described as a short-term data store and second level DRC 124 can be generally described as a long-term data store, whereby predictions in first level DRC 122 eventually migrate to second level DRC 124 when a processor does not request those predictions. According to an embodiment of the present invention, either first level DRC 122 or second level DRC 124, or both, can store prefetched program instructions and program data based on a predicted address, as well as a processor-requested address. Also, cache filter 110, first level DRC 122 and second level DRC 124 cooperate to reduce latency of providing prefetched program instructions and program data by reducing redundant predictions as well as by speeding up prefetching of predictive information (e.g., by anticipating page opening operations), for example. Note that although the following discussion relates to a multi-level cache memory (i.e., multiple caches), any of the following exemplary embodiments can include a single cache memory.

Cache filter 110 is configured to compare a range of input addresses against each of a number of multiple caches in parallel, where the multiple caches are hierarchical in nature. For example, a first cache can be smaller in size and adapted to store predictions for a relatively short period of time, whereas a second cache can be larger in size and an adapter can be used to store predictions for durations longer than that of the first cache. Further the second cache receives its predicted address and corresponding predicted data only from the first cache, according to one embodiment of the present invention. To examine both caches in parallel, especially where the second cache is larger than the first, cache filter generates two representations of each address "looked up," or examined in the caches. With one representation used for the first cache and the second representation used for the second cache, both caches can be examined simultaneously. One reason for this can be that there are more addresses and entries requiring examination in a larger cache than in a smaller cache. So if both are to be examined at one time, a more efficient technique for examining addresses of the larger cache is needed than that of the smaller cache. The query interfaces discussed below perform these functions.

Prefetcher 100 also includes a speculator 108 for generating predictions. Specifically, speculator 108 includes a sequential predictor ("SEQ. Predictor") 102 to generate sequential predictions, such as forward sequential predictions, reverse sequential predictions, back blind sequential predictions, back sector sequential predictions, and the like. Also, speculator 108 includes a nonsequential predictor ("NONSEQ. Predictor") 104 for forming nonsequential predictions. Prefetcher 100 uses these predictions to "fetch" both program instructions and program data from a memory (not shown), and then store the fetched program instructions and program data in multi-level cache 120 before a processor (not shown) requires the instructions or data. By fetching them prior to use (i.e., "prefetching"), processor idle time (e.g., the time during which the processor is starved of data) is minimized.

Nonsequential predictor 104 includes a target cache (not shown) as a repository for storing an association for a preceding address to one or more potential nonsequential addresses that can each qualify as a nonsequential prediction. The target cache is designed to compare its contents against incoming detected addresses for generating nonsequential predictions in an expeditious manner, whereby the target cache is configured to prioritize its stored nonsequential predictions in response to, for example, a hit in multi-level cache 120. Specifically, when multi-level cache 120 provides a predicted address to a processor upon its request, then the stored trigger-target association of which that address belongs is elevated in priority. A "trigger" address is a detected address from which nonsequential predictor 104 generates a nonsequential prediction, with the resulting prediction referred to as a "target" of an unpatternable association formed between the two. Note that a trigger address can also refer to an address that gives rise to a sequential prediction, which also can be referred to as a target address.

Prefetcher 100 also includes a filter 114, an optional prediction inventory 116, an optional post-inventory filter 117, and an optional arbiter 118. Here, filter 114 can be configured to include an inventory filter (not shown) for comparing generated predictions to previously-generated predictions that reside in prediction inventory 116. Prediction inventory 116 provides a temporary storage for storing generated predictions until arbiter 118 selects a prediction to access a memory. Arbiter 118 is configured to determine which prediction of the generated predictions is to be issued for accessing the memory when prefetching instructions and data. In some embodiments, filter 114 can include cache filter 110, which can be configured to compare generated predictions to those previously-generated predictions that have caused program instructions and program data to be already "prefetched" into multi-level cache 120. So if any of the generated predictions is redundant to any previously-generated prediction stored in multi-level cache 120, then that redundant prediction can be voided (or invalidated) so as to minimize the number of predictions requiring governance, thereby freeing up prefetcher resources.

In operation, speculator 108 monitors a system bus as a processor requests access to a memory ("read requests"). As the processor executes program instructions, speculator 108 detects read requests for addresses that contain program instructions and program data yet to be used by the processor. For purposes of discussion, an "address" is associated with a cache line or unit of memory that is generally transferred between a memory and a cache memory, such as multi-level cache 120. An "address" of a cache line can refer to a memory location, and the cache line can contain data from more than one address of the memory. The term "data" refers to a unit of information that can be prefetched, and the terms "program instructions" and "program data" respectively refer to instructions and data used by the processor in its processing. So, data (e.g., any number of bits) can represent "predictive information," which refers to information that constitutes either the program instructions or program data, or both. Also, the term "prediction" can be used interchangeably with the term "predicted address." When a predicted address is used to access the memory, one or more cache lines containing that predicted address, as well as other addresses (predicted or otherwise), is typically fetched.

When prefetcher 100 issues predictions, it can append or associate a reference to each prediction. In the case where a prediction is a nonsequential prediction, the reference associated therewith can include a prediction identifier ("PID") and a corresponding target address. A PID (not shown) identifies the trigger address (or a representation thereof) that caused the corresponding target address to be predicted. This reference is received by multi-level cache 120 when the memory returns prefetched data. Thereafter, multi-level cache 120 temporarily stores the returned data until such time that the processor requests it. During the time that multi-level cache 120 stores the prefetched data, it manages that data for filtering against generated predictions, for ensuring coherency of the data stored therein, for classifying its data as either short term or longer term data, and the like. But when the processor does request the prefetched data (i.e., predictive information), that data is sent to the processor. If data being placed in multi-level cache 120 is the result of a nonsequential prediction, then a reference can be sent to nonsequential predictor 104 for readjusting a priority of nonsequential prediction stored in the target cache, if necessary.

Figure 2:
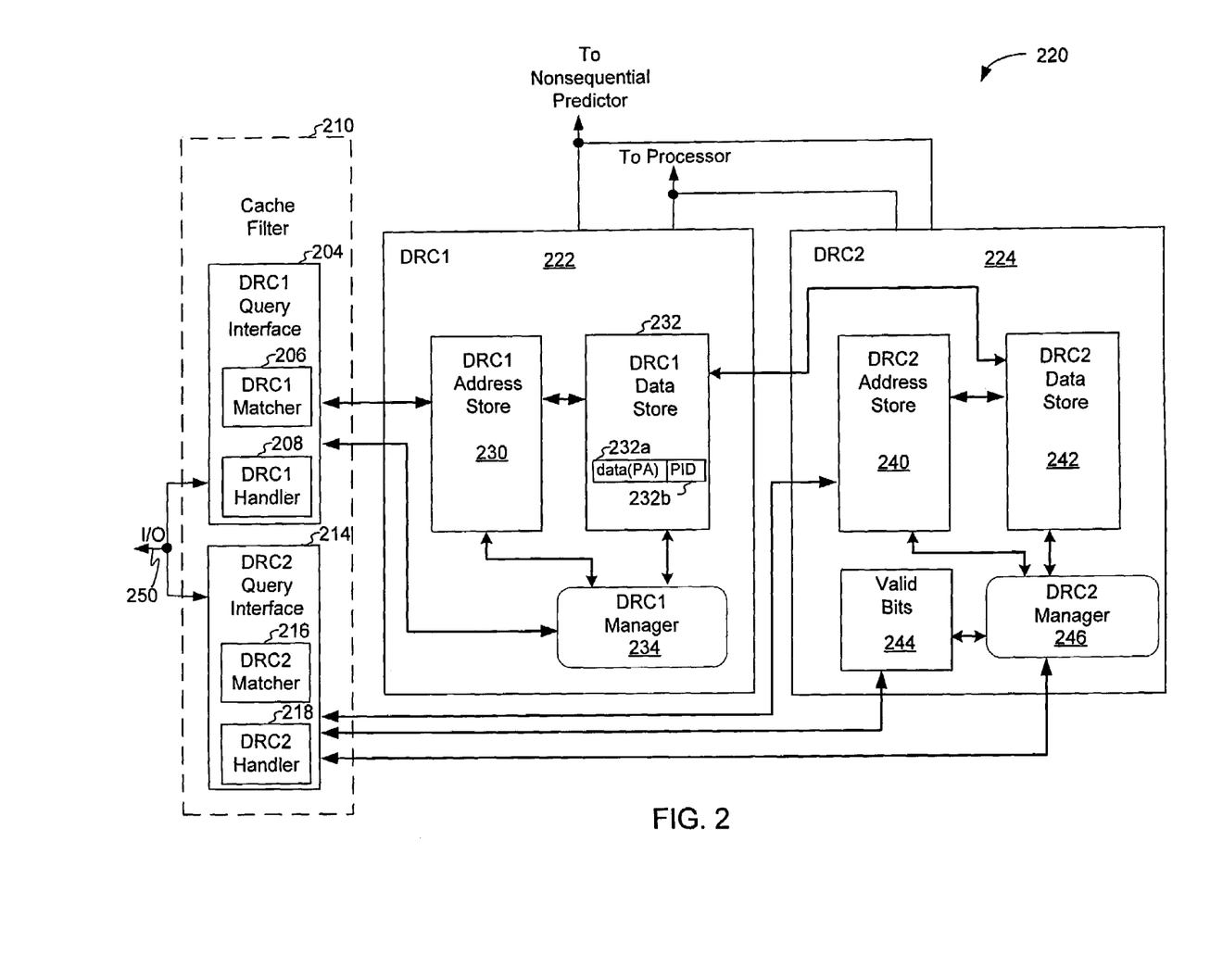
FIG. 2 illustrates an exemplary multi-level cache, according to one embodiment of the present invention.

FIG. 2 illustrates an exemplary multi-level cache 220, according to one embodiment of the present invention. Multi-level cache 220 includes a cache filter 210, a first level data return cache ("DRC1") 222 and a second level data return cache ("DRC2") 224. Cache filter 210 includes a DRC1 query interface 204 and a DRC2 query interface 214 for respectively interfacing first level DRC 222 and second level DRC 224 with components of prefetcher 100 as well as other components, such as those of a memory processor (not shown). One such memory processor component is a write-back cache 290 of FIG. 1, which operates in accordance with a well known caching method whereby modifications to data in a cache are not copied to the cache source (e.g., system memory) until necessary. As write-back cache 290 is similar in structure and functionality to those well known in the art, it need not be discussed in detail. Further, DRC1 query interface 204 contains a DRC1 matcher 206 and DRC1 handler 208, and DRC2 query interface 214 contains a DRC2 matcher 216 and DRC2 handler 218.

First level DRC 222 includes a DRC1 address store 230 for storing addresses (e.g., predicted addresses), where DRC1 address store 230 is coupled to a DRC1 data store 232, which stores data (i.e., predictive information) and PIDs. For example, prefetched data resulting from predicted address ("PA") can be stored as data(PA) 232a in association with PID 232b. This notation denotes a predicted address PA having contributed to prefetching data that represents predictive information. When data(PA) 232a is requested by a processor, the corresponding predicted address, PA, and prediction identifier, PID 232b, will be communicated to nonsequential predictor 104 to modify the priority of that predicted address, if necessary. Prediction identifier, PID 232b generally contains information indicating the trigger address giving rise to the PA. Note that a PA generated by nonsequential predictor 104 can also be referred as a target address, as a processor-requested address (and related data), can also be stored in multi-level cache 220. Further note that data(PA) 232a need not necessarily be accompanied by a PID 232b.

Further, both DRC1 address store 230 and DRC1 data store 232 are communicatively coupled to a DRC1 manager 234, which manages the functionality and/or structure thereof. Second level DRC 224 includes a DRC2 address store 240 coupled to a DRC2 data store 242, which stores data in similar form to that of data 232a and PID 232b. Both DRC2 address store 240 and DRC2 data store 242 are communicatively coupled to a DRC2 manager 246, which manages the functionality and/or structure thereof.

In a specific embodiment of the present invention, second level DRC 224 also includes a repository of "valid bits" 244 for maintaining valid bits 244 separate from DRC2 address store 240, each valid bit indicating whether a stored prediction is either valid (and available for servicing a processor request for data) or invalid (and not available). An entry having an invalid prediction can be viewed as empty entry. By keeping bits of valid bits 224 separate from addresses, resetting or setting one or more valid bits is less computationally burdensome and quicker than if DRC2 address store 240 stores the valid bits with the corresponding addresses. Note that in most cases, valid bits for addresses of DRC1 are typically stored with or as part of those addresses.

In operation, DRC1 query interface 204 and DRC2 query interface 214 are configured to respectively examine the contents of first level DRC 222 and second level DRC 224 to determine whether they include any of one or more addresses applied as "input addresses." An input address can originate from speculator 108 as a generated prediction, from a write-back cache as a write address, or from another element external to multi-level cache 220. Generally an input address, as described herein, is a generated prediction that is compared against the contents of multi-level cache 220 to filter out redundancies. But sometimes the input address is a write address identifying a location of a memory to which data is or will be written. In this case, multi-level cache 220 is examined to determine whether an action is required to maintain coherency among a memory, DRC1 data store 232, and DRC2 data store 242.

DRC1 matcher 206 and DRC2 matcher 216 are configured to determine whether one or more input addresses on input/output port ("I/O") 250 are resident in DRC1 address store 230 and DRC2 address store 240, respectively. When either DRC1 matcher 206 or DRC2 matcher 216 detect that an input address matches one in first level DRC 222 and second level DRC 224, then an associated handler, such as DRC1 handler 208 or DRC2 handler 218, operates to either filter out redundant predictions or ensure data in multi-level cache 220 is coherent with a memory. Note that DRC1 matcher 206 and DRC2 matcher 216 can be configured to compare a range of input addresses against the contents of first level DRC 222 and second level DRC 224 in parallel (i.e., simultaneously or nearly simultaneously, such is in one or two cycles of operation (e.g., clock cycles), or other minimal number of cycles, depending on the structure of multi-level cache 220). An example of a range of input addresses that can be compared in parallel against the caches is address A0 (the trigger address) and predicted addresses A1, A2, A3, A4, A5, A6, and A7, the latter seven possibly being generated by sequential predictor 102.

When examined simultaneously, matchers 206, 216 that perform such a comparison is said to be performing "a look-ahead lookup." In some embodiments, a look-ahead look up is performed when a processor is idle, or when not requesting data from prefetcher 100. Also note that although similar in functionality, the respective structures of DRC1 matcher 206 and DRC2 matcher 216 are adapted to operate with DRC1 address store 230 and DRC2 address store 240, respectively, and therefore are not necessarily similarly structured. Examples of DRC1 matcher 206 and DRC2 matcher 216 are discussed below in connection with FIG. 3A and FIG. 4, respectively, according to at least one specific embodiment of the present invention.

Next, consider situations when query interfaces 204, 214 are performing filtering operations. By comparing a number of input addresses against the contents of multi-level cache 220, and by detecting input addresses that do not match, handlers 208, 218 can take appropriate action to filter out matched predictions (i.e., redundant predictions) while permitting unmatched input address to proceed as generated predictions to fetch predictive information sooner than if filtering was not performed. As such, multi-level cache 220 and its cache filter 210 decrease the latency by more quickly determining which cache line to start fetching. This in turn makes it more likely to decrease latency experienced by the processor because first level DRC 222 and second level DRC 224 caches are generally more likely to contain prefetched predictive information sooner than if predictions either were not compared in parallel or were not filtered out, or both.

DRC1 address store 230 and DRC2 address store 240 each store addresses associated with prefetched data stored in DRC1 data store 232 and DRC2 data store 242, respectively. Each of address stores 230 and 240 stores either the addresses, or an alternative representation of addresses. In accordance with one embodiment of the present invention, an exemplary DRC1 address store 230 is fully associative and is configured to store a complete unique address. For example, bits 35:6 for each address are stored in DRC1 to uniquely identify those addresses. Note that the addresses stored in DRC1 address store 230 can be viewed as including common portions (e.g., tags) and delta portions (e.g., indexes), both of which are used to represent addresses during look-ahead lookup of DRC1 in accordance with at least one embodiment. Further, DRC1 address store 230 and DRC1 data store 232 are configured to store 32 entries of addresses and 64 byte cache lines per address entry of data, respectively. Although prefetched data generally originates from a memory, such as a dynamic random access memory ("DRAM"), it can originate from a write back cache if data in DRC1 data store 232 requires updating.

By contrast, an exemplary DRC2 address store 240 can be composed of four-way set associative entries and can be configured to store base portions (e.g., tags) to represent addresses. Further, DRC2 address store 240 and DRC2 data store 242 are configured to store 1024 entries of addresses and 64 byte cache lines per address entry of data, respectively. DRC2 data store 242 stores prefetched data originating from DRC1 data store 232, and in some implementations can be composed of any number of memory banks (e.g., four banks: 0, 1, 2, and 3).

Although the memory from which predictive information is prefetched is typically a DRAM memory (e.g., arranged in a Dual In-line Memory Module, or "DIMM"), the memory can be of any other known memory technology. Typically, the memory is subdivided into "pages," which are sections of memory available within a particular row address. When a particular page is accessed, or "opened," other pages are closed, with the process of opening and closing pages requiring time to complete. So, when a processor is executing program instructions in a somewhat scattershot fashion, in terms of fetching instructions and data from various memory locations of a DRAM memory, accesses to the memory are nonsequential. As such, a stream of read requests can extend over a page boundary. If the next address in the next page is not available, the processor normally must fetch program instructions and program data directly from the memory. This increases latency of retrieving such instructions and data. So by prefetching and storing predictive information that spans multiple pages in multi-level cache 220, then latency related to opening pages is reduced in accordance with the present invention. And because data being prefetched comes from the cache, the latency seen by, or with respect to, the processor is reduced while an accessed page remains opened.

For example, consider that nonsequential predictor 104 correctly predicts that address "00200" is to be accessed following a processor read of address "00100." Therefore, nonsequential predictor 104 causes a range of lines (e.g., one target address and four predicted address, the number of predictions generate being configurable and defined by a batch, "b") starting at address "00200" (as well as addresses 00201, 00202, 00203 and 00204, if batch is four) to be fetched in advance of the processor actually accessing address "00200." When the processor does actually perform a read for address "00200," look-ahead lookup of multi-level cache 220 quickly determines which cache lines within a specified range following address "00200" have already been prefetched. Since nonsequential transitions in the read address stream can be accompanied by a DRAM page opening operation, the look-ahead lookup allows prefetcher 100 to quickly look ahead in a stream of read requests and determine which address or cache line needs to be fetched. By beginning the fetch quickly, prefetcher 100 can often hide the latency of the DRAM page opening operation, and thereafter provide a sequential stream of cache lines (albeit nonsequential with the trigger address forming the basis for the target address) without incurring a latency penalty on the processor.

FIG. 2 depicts DRC1 manager 234 and DRC2 manager 246 as separate entities, but they need not be. That is, DRC1 manager 234 and DRC2 manager 246 can be combined into a single management entity or can be disposed external to multi-level cache 220, or both. As first level DRC 222 and second level DRC 224 are structurally and/or functionally unlike conventional L1 and L2 caches resident in a processor, unique policies of managing the predictive information stored within multi-level cache 220 are employed. Examples of such policies include a policy for allocating memory in each data return cache, a policy for copying information from a short term to a long term data store, and a policy for maintaining coherency between multi-level cache 220 and another entity, such as a write-back cache.

First, consider a copying policy used to manage the copying of predictive information from first level DRC 222 to second level DRC 224 as that information ages from short term to long term information. DRC1 manager 234 cooperates with DRC2 manager 246 to transfer data from DRC1 data store 232 to DRC2 data store 242 when that data has been in first level DRC 222 up to a certain threshold of time. Note that the threshold can be constant or can otherwise vary during operation. Typically, aged data can be configured to be transferred whenever there are less than N invalid entries (i.e., available) in DRC1, where N is programmable. In operation, once the data has been copied from short term to long term storage, the entry in first level DRC 222 is erased (i.e., invalidated).

Second, consider an allocation policy for inserting predictive information in first level DRC 222 and second level DRC 224. When inserting predictive information into first level DRC 222, DRC1 manager 234 selects any invalid entries in DRC1 data store 232, excluding locked entries as candidates. If DRC1 manager 234 does not detect any invalid entries into which predictive information can be stored, then the oldest entry can by used to allocate space for an entry. As for allocating entries in DRC2 data store 242, DRC2 manager 246 can use any of a number of ways (e.g., one of four ways) for receiving data copied from first level DRC 222 to second level DRC 224. For example, an index of the predicted address can contain four entries in which to store data. Initially, DRC2 data store 242 allocates any one of the number of ways that are not being used (i.e., invalidated). But if all ways are assigned, then the first one in is the first one out (i.e., the oldest is overwritten). But if the oldest entries have the same age and are valid, DRC2 manager 246 allocates the unlocked entry. Lastly, if all of the entries in the set of ways are locked, then DRC2 manager 246 suppresses writes from first level DRC 222 to second level DRC 224 while maintaining the entry in first level DRC 222 as valid. Again, note that typically second level DRC 224 receives data for storage from only first level DRC 222.

Another policy to which DRC1 manager 234 and DRC2 manager 246 can adhere to relates to maintaining coherency. DRC1 manager 234 maintains first level DRC 222 coherency by updating the data of any entry that has an address that matches the write address to which data will be written. Typically, write-back cache 290 (FIG. 1) transitorily stores a write address (and corresponding data) until it sends the write address to write to memory (e.g., DRAM). Note that in some cases where there is an address of a read request that matches a write address in write-back cache 290, then multi-level cache 220 merges data of the write address with that of the memory prior to forwarding the data to first level DRC 222. DRC2 manager 246 maintains second level DRC 224 coherency by invalidating any entry whose address matches a write address when it is loaded into write back cache 290. As second level DRC 224 only receives data from DRC1, and since first level DRC 222 maintains coherency with memory and write-back cache 290, then second level DRC 224 generally will not contain stale data. Further, any address that is to be copied from DRC1 to DRC2 can be first checked against the write back cache ("WBC") 290. If a match is found in WBC 290, then the copy operation is aborted. Otherwise, the copying of that address from DRC1 to DRC2 takes place. This additional check further helps maintain coherency.

Figure 3A:
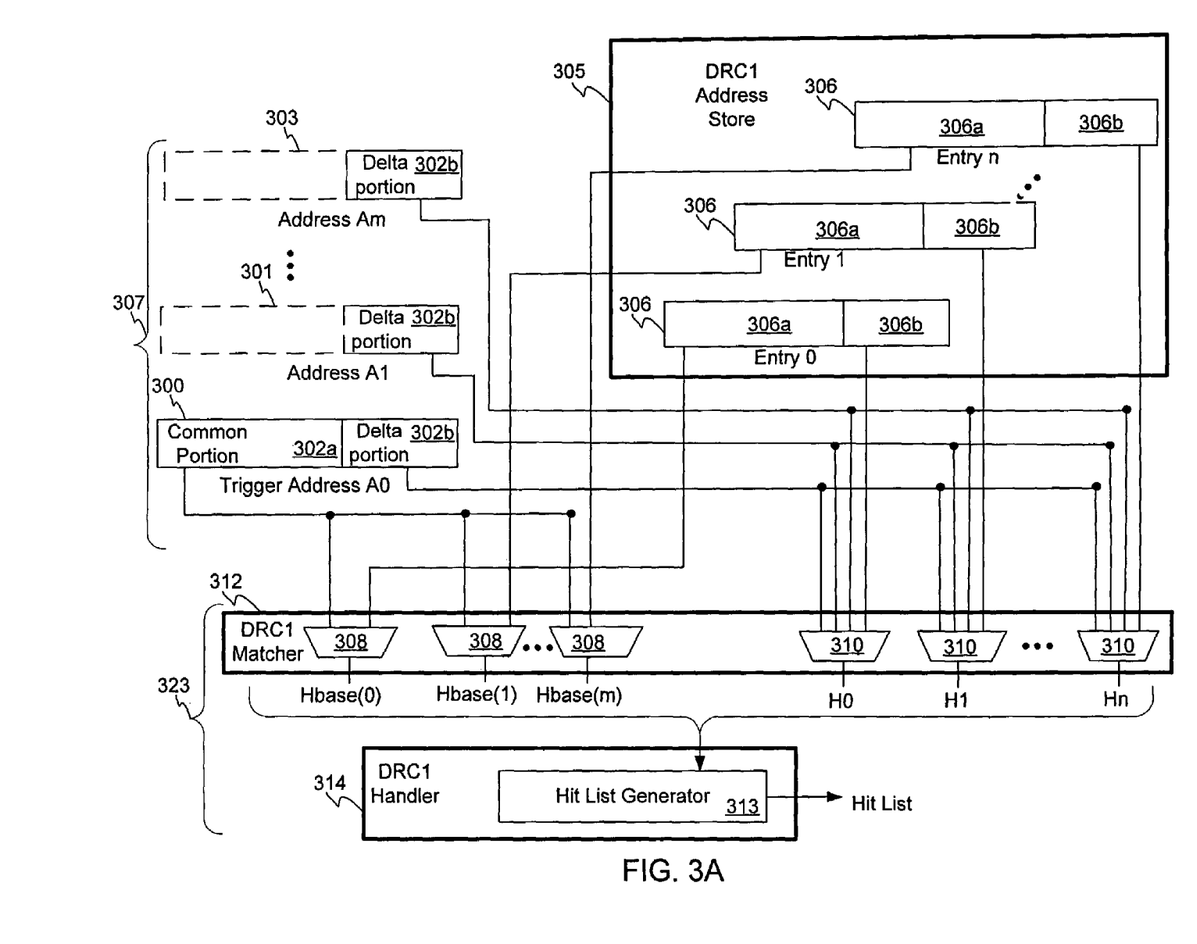
FIG. 3A illustrates an exemplary first query interface for a first address store in accordance with a specific embodiment of the present invention.

FIG. 3A illustrates an exemplary DRC1 query interface 323 for a first address store 305 in accordance with a specific embodiment. In this example, a trigger address ("A0") 300 (e.g., a processor-requested address) is composed, as an input address, of a common address portion 302a and a delta address portion 302b. Note that address 300 can also be either a predicted address in some cases, or a write address in other cases (when maintaining coherency). When address 300 is a trigger address that generates a group of predicted addresses, then such a group 307 can include addresses such as those identified from address ("A1") 301 through to address ("Am") 303, where "m" represents any number of predictions that can be used to perform "look-ahead lookup" in accordance with at least one embodiment of the present invention. In some cases, "m" is set equivalent to batch size, "b."

Entries 306 of DRC1 address store 305 each include a first entry portion 306a (e.g., a tag) and a second entry portion 306b (e.g., an index). In a specific embodiment, first entry portion 306a and second entry portion 306b are respectively analogous to common address portion 302a and delta address portion 302b. Second entry portions 306b indicate the displacement in terms of address from trigger address ("A0") 300 to that particular entry 306. So, when DRC1 matcher 312 compares an input address, such as trigger address ("A0") 300, to entries 306, common portion 302a can be used to represent the common portions of the addresses of group 307. Further, as common portion 302a of address 300 is generally similar to the common portions for addresses ("A1") 301 through to ("Am") 303, then only common portion 302a need be used to compare against one or more first entry portions 306a of entries 306. Also, delta portions 302b for addresses ("A1") 301 through to ("Am") 303 can be matched against multiple second entry portions 306b of entries 306.

In one embodiment, DRC1 matcher 312 includes common comparators 308 to match common address portions against first entry portions, and delta comparators 310 to match delta address portions against second entry portions. Specifically, common portion 302a is simultaneously compared against first portions 306a for Entry 0 through to the $n^{th}$ Entry, and delta portions 302b are simultaneously compared against second portions 306b for the same entries. In some embodiments, common comparators 308 is a "wide" comparator for comparing high-order bits (e.g., bits 35:12 of a 36-bit address) and delta comparator 310 is a "narrow" comparator for comparing low-order bits (e.g., bits 11:6 of a 36-bit address). Note that although FIG. 3A depicts one delta comparator per delta portion 302b, in some cases, the number of delta comparators 310 is equal to m * n (not shown), where each delta comparator would receive one delta portion 302b and one second entry portion 306b as inputs. The comparator sizes limit the amount of physical resources required to perform these comparisons, and as such, addresses that are looked up in parallel are configured to lie within the same memory page (e.g., a memory page size is typically 4 K bytes). Though this reduces the addresses of look-ahead lookups from crossing page boundaries, these configurations decrease the cost for performing look-ahead lookups in terms of physical resources. Again note that common portion 302a and delta portions 302b are each compared simultaneously, or nearly so, with entries 306.

The output of common comparators 308 and delta comparators 310 are Hbase(0), Hbase(1), . . . Hbase(m) and H0, H1, H2, . . . HN, respectively, where each are either zero (e.g., indicating no match) or one (e.g., indicating match). The results form a hit vector of zeros and ones that are sent to DRC1 hander 314 to take action, depending on whether it is filtering or maintaining coherency. Hit list generator 313 generates a list of hits ("hit list") indicating which addresses in range "r" (i.e., group 307) reside in DRC1 address store 305. If an address is matched (i.e., a prediction is stored therein), then that address is included in the hit list, whereas an unmatched address (i.e., a prediction is not stored) is excluded from the hit list. This hit list is used to generate predictions or to manage coherency within DRC1 address store 305.

Figure 3B:
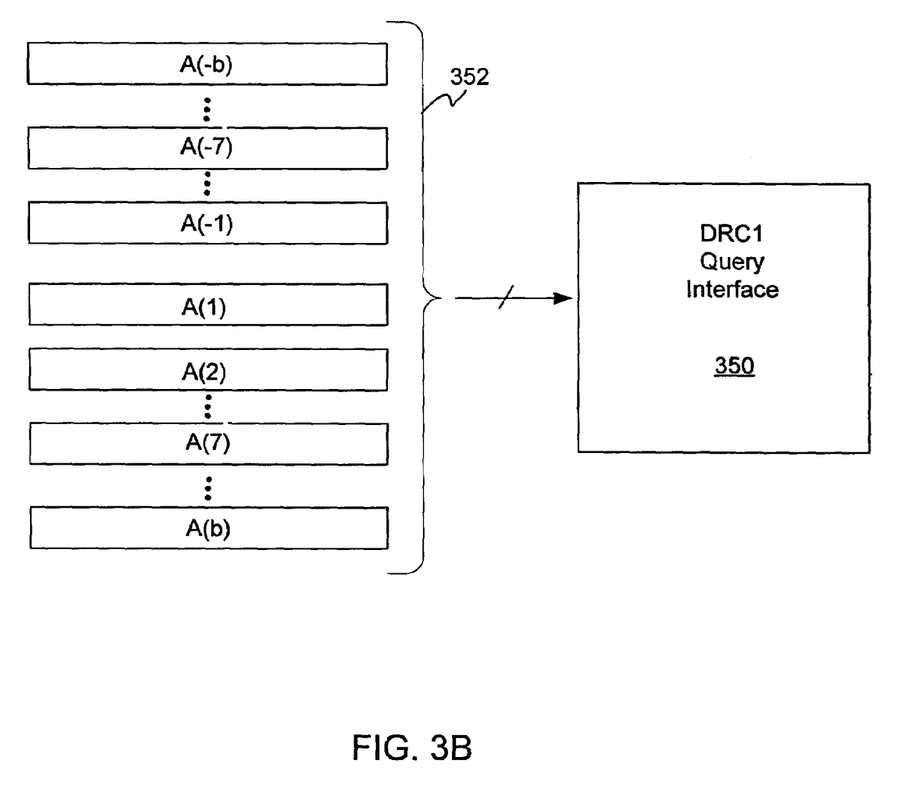
FIG. 3B shows that any number of input addresses can be examined in parallel using the first query interface of FIG. 3A.

FIG. 3B depicts a number of exemplary input addresses 352 that can be examined in parallel using DRC1 query interface 323 of FIG. 3A in accordance with a specific embodiment. Here, DRC1 query interface 350 can accept any range of addresses 352 to match against DRC1 address store 305. Matcher 312 of FIG. 3A is replicated as many times as is necessary to perform a parallel look-ahead lookup over a number of input addresses. As an example, for forward sequential predictions, with batch size "b" set to 7, DRC1 query interface 350 would require matchers to match A0, as a base (or trigger) address in parallel with predicted addresses A1 to A7 as group 307. For blind back predictions, only A(−1) requires matching besides base address A0 as group 307, but for reverse sequential predictions, addresses A(−1) to A(−7) require matching. Note that range of addresses 352 can be applied simultaneously, in parallel, to both the DRC1 and DRC2 query interface as well.

Figure 4:
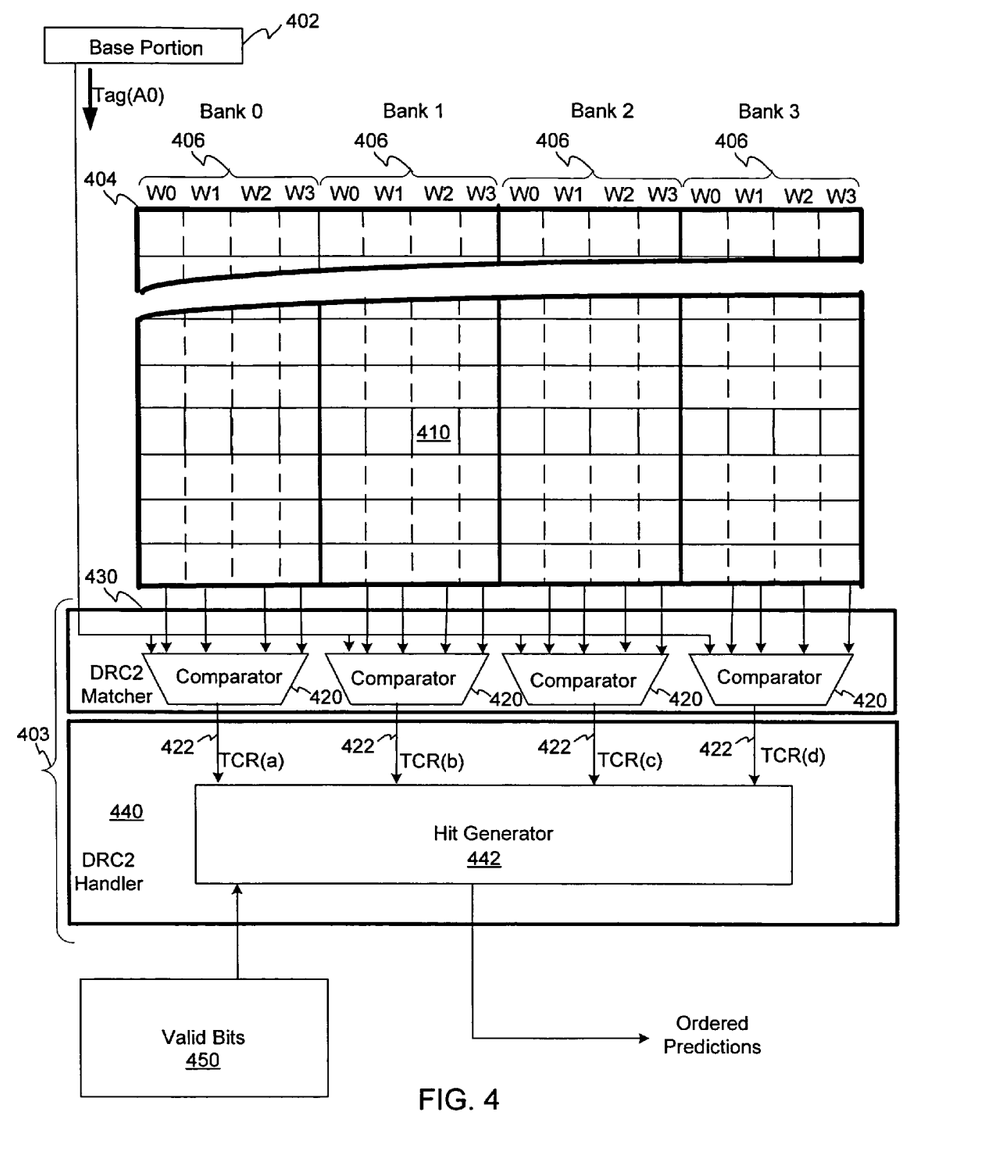
FIG. 4 illustrates an exemplary second query interface for a second address store in accordance with a specific embodiment of the present invention.

FIG. 4 illustrates an exemplary DRC2 query interface 403 for DRC2 address store 404 in accordance with a specific embodiment. DRC2 query interface 403 is configured to receive an input address 402 for comparing that address against the contents of DRC2 address store 404. In this example, input address 402 is a base portion (e.g., a tag) of an address, such as a tag(A0). Further to this example, DRC2 address store 404 is composed of four banks 406 of memory, banks 0, 1, 2, and 3, each bank including entries 410. Note that in this case, an entry 410 can be placed into any one of four ways (W0, W1, W2, and W3).

Figure 5A:
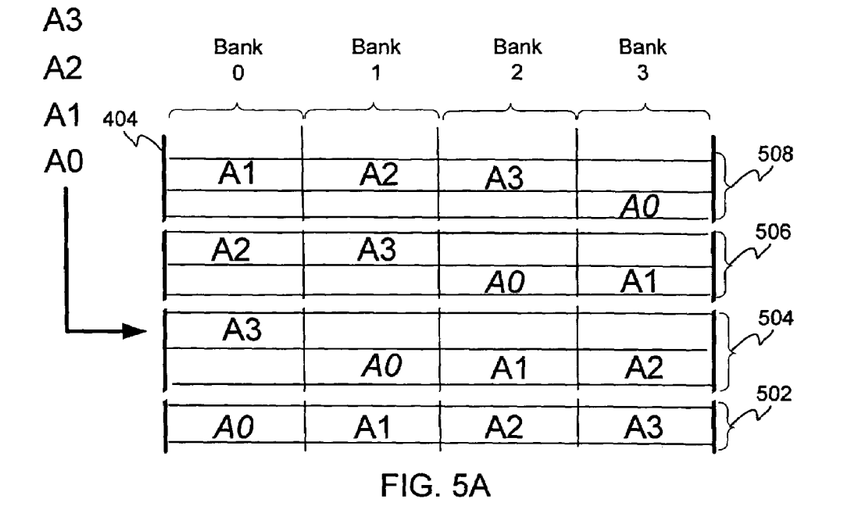
FIG. 5A depicts possible arrangements of exemplary addresses (or representations thereof) as stored in a second address store, according to one embodiment of the present invention.

DRC2 matcher 430 includes a number of comparators to compare tag(A0) against entries 410. Generally, any matching address in DRC2 address store 404 shares the same tag(A0), but can differ in relation to another group of bits (e.g., by an index). In a specific embodiment of the present invention, the determination of whether a tag matches any entry within DRC2 address store 404 is generally performed as follows. First, for each bank 406, one of the indexes in that bank is selected to be searched for potential matching addresses. This can vary per bank, as shown in FIG. 5A, because the selected bank to be searched depends on which one of the banks a specific address (e.g., A0 of FIG. 5A) resides, as banks can be identified by certain index bits of the specific address (e.g., A0). Second, all four ways of the index chosen for each bank 406 are accessed. Then, the tags stored in relation to the four ways (e.g., W0 to W3) are compared against tag(A0), which in this example is base address 402. Generally, it is sufficient to compare tag(A0) without comparing other tags, such as tag(A1). This is because these tags are generally assumed to be identical (e.g., tag(A0)=tag(A1)=tag(A2)). Note that a simultaneous search for predictions is typically limited to those that lie in the same page, such as a 4 kbyte page, which causes the tags to be the same. Third, once an address match is made by DRC2 matcher 430, results in the form of a hit vector and the valid bits are used to get a final hit vector similar to as described in connection with FIGS. 7 and 8.

Hit generator 442 of DRC2 query interface 403 receives the tag comparison results ("TCR") 422 from DRC2 matcher 430, and further compares those result against corresponding valid bits 450 to generate an ordered set of predictions ("ordered predictions"). Here, tag comparison results from banks 1, 2, 3 and 4 are respectively labeled TCR(a), TCR(b), TCR(c), and TCR(d), each including one or more bits representing whether a tags matches one or more entries 410. Ordered predictions can be an ordered set of predictions that match (or do not match) input address 402. Or, ordered predictions can be a vector of bits each indicating whether an input address has an address that is present in DRC2 address store 404. Note that any number of input addresses 402 can be similarly matched against DRC2 query interface 403 if additional DRC2 matchers 430 are included. FIGS. 5B to 8 describe exemplary hit generators in accordance with some embodiments of the present invention.

FIG. 5A depicts possible arrangements of addresses (or representations thereof) as stored in DRC2 address store 404, according to one embodiment of the present invention. Note that ways W0, W1, W2 and W3 are not shown so as to simplify the following discussion. Input addresses A0, A1, A2, and A3 are stored in DRC2 address store 404. As an example, sequential predictor 102 (not shown) can generate sequential predictions A1, A2, and A3 based on trigger address A0 (e.g., in any of four ways). A first arrangement 502 results from A0 being stored in bank 0. Likewise, second arrangement 504, third arrangement 506 and fourth arrangement 508 each respectively resulting from storing address A0 in banks 1, 2, and 3, with subsequent addresses stored in series following the trigger address. As such, these addresses (or portions thereof, such as in the form of tags) generally are output from DRC2 address store 404 in no particular order.

Figure 5B:
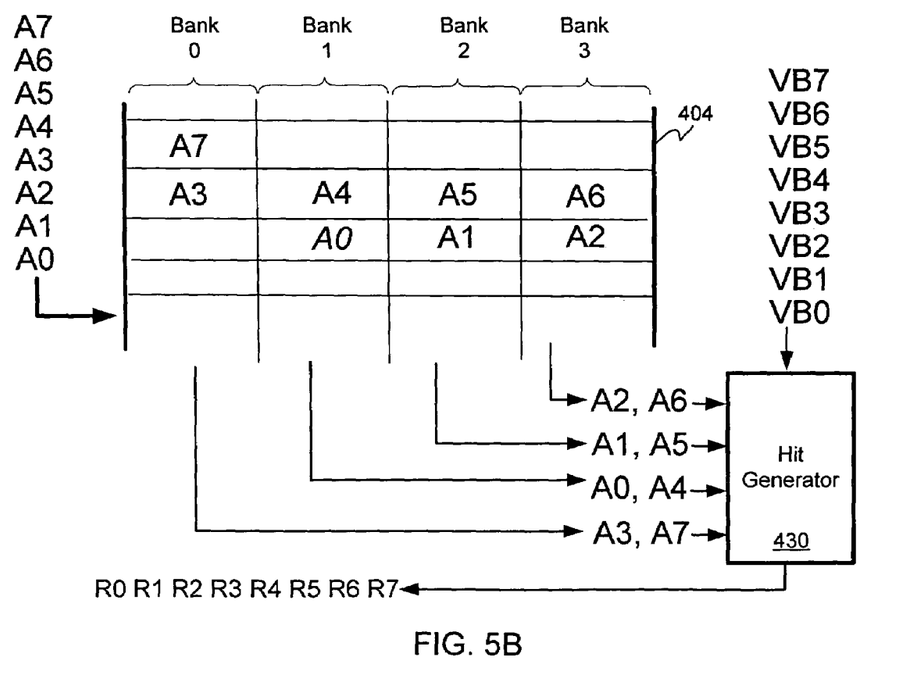
FIG. 5B depicts an exemplary hit generator that generates results based on unordered addresses and ordered valid bits, according to an embodiment of the present invention.

FIG. 5B depicts an exemplary hit generator 442 that generates results based on unordered addresses and corresponding valid bits, according to an embodiment of the present invention. In this example, sequential predictor 102 generates sequential predictions A1, A2, A3, A4, A5, A6 and A7 based on trigger address A0, all of which are stored in the particular arrangement shown (i.e., trigger address A0 is stored in bank 1 with the others following). Hit generator 430 receives unordered addresses A2, A6, A1, A5, A0, A4, A3, A7 and ordered valid bits VB0 to VB7, orders them, compares them and then generates results R0 to R7, which can be a bit vector or a list of addresses (either those that match or those that do not). Note that a valid bit indicating that a prediction is invalid prevents a stored, invalid prediction from being matched. This one reason to match valid bits against contents of an address store. In accordance with a specific embodiment of the present invention, four addresses rather than eight are simultaneously considered, such as either addresses A2, A1, A0 and A3 or addresses A6, A5, A4 and 7. As such, there is no need to represent addresses A0 to A7 as being contiguously accessible in a "wrapped" manner, as is shown in FIG. 5B. To simultaneously consider addresses A0 to A7 of FIG. 5B, however, DRC2 can be configured as a double-ported random access memory ("RAM") to perform two independent and simultaneous accesses to the same RAM (or same DRC2).

Figure 6:
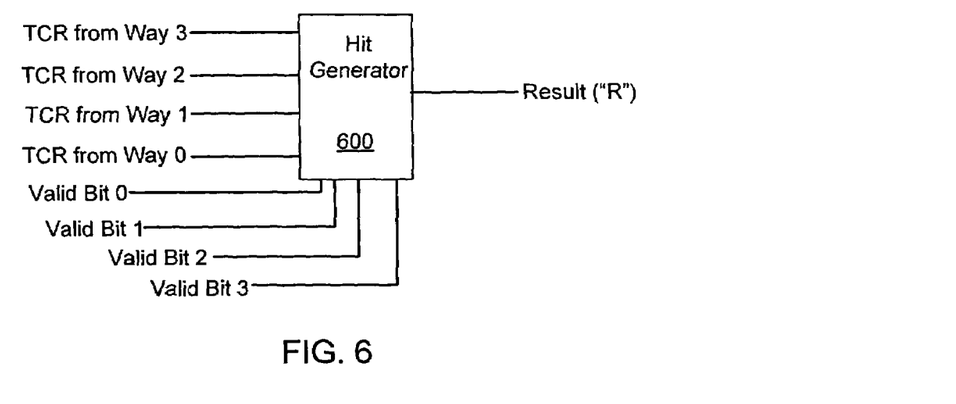
FIG. 6 is a schematic representation of a component for generating one result, R, of the hit generator of FIG. 5B, according to an embodiment of the present invention.

FIG. 6 is a schematic representation of a hit generator 600 for hit generator 442 of FIG. 4. Hit generator 600 generates one or more of results R0 to R7 by multiplexing addresses from ways 0 to 3 and/or valid bits for each input address, where the result, R, is determined by comparing the multiplexed bits of addresses or valid bits. If a valid bit indicates that the tag indicated by the corresponding tag comparison result ("TCR") is valid, then that tag is output as result R. Note that a TCR can be a tag of an address or it can be a bit having a value of either a "1" (i.e., hit in DRC2) or "0" (i.e., no hit in DRC2). As is described below in connection with FIGS. 7 and 8, a tag for an address (e.g., tag(A1)) generally represents a single TCR bit for that tag.

Figure 7:
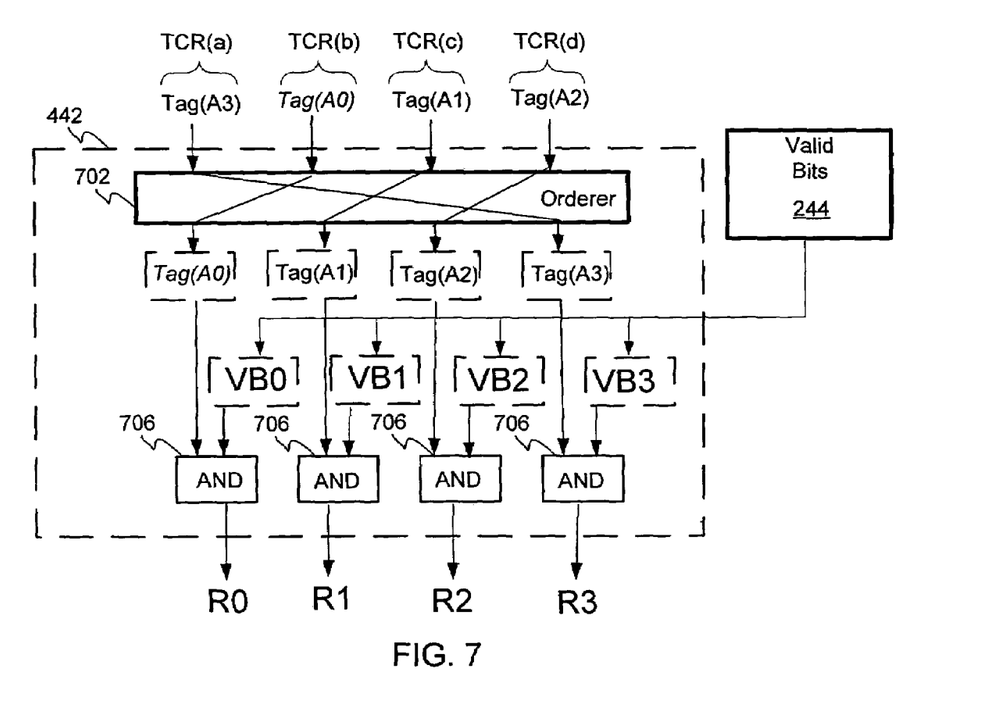
FIG. 7 depicts one example of a hit generator, according to a specific embodiment of the present invention.

FIG. 7 depicts one example of hit generator 442, according to one embodiment of the present invention. Hit generator 442 includes an orderer 702 configured to order the unordered tags for address A3, A0, A1 and A2 from the ways of banks 0, 1, 2, and 3, respectively. But note that tags for address A3, A0, A1 and A2 each represent single bits representing TCRs for each tag. Next the ordered TCRs (shown as ordered tags for addresses A0, A1, A2, and A3) are tested against valid bits VB0-VB3 from valid bits 244. AND operator ("AND") 706 performs the test as a logical AND function. So, if a valid bit is true and a single-bit TCR is true, then there is a hit and the results, R, reflect this. That is, the results R0, R1, R2, and R3 form the ordered prediction results, which again can be bits representing match/no match, or can be matched tags for addresses or those that do not. Note that in cases where the tag itself is used as a TCR (e.g., Tag(A3) as TCR(a)), then AND operator 706 operates to mask those bits if the corresponding valid bit is zero (e.g., a result, R, will contain all zeros if its corresponding valid bit is zero).

Figure 8:
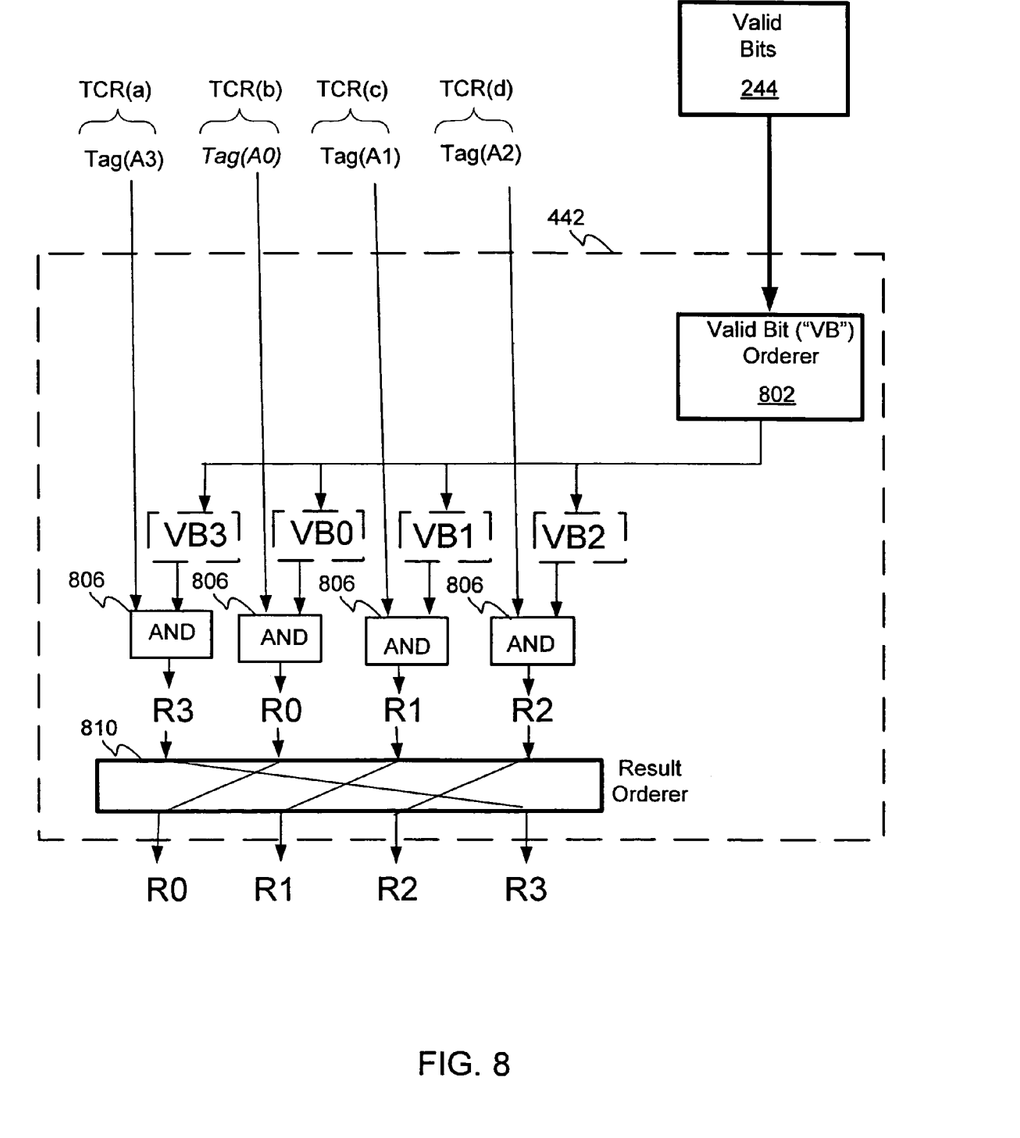
FIG. 8 depicts another example of a hit generator, according to another embodiment of the present invention.

FIG. 8 depicts another example of hit generator 442, according to another embodiment of the present invention. Hit generator 442 includes a valid bit ("VB") orderer 802 configured to disorder the ordered valid bits VB0-VB3 from valid bits 244. That is, valid bit orderer 802 reorders valid bits from having a order VB0, VB1, VB2, and VB3 to an order of VB3, VB0, VB1 and VB2, which matches the order of the TCRs, which are represented by tags for addresses A3, A0, A1 and A2. Next the unordered tags for the addresses (i.e., unordered TCRs for those tags) are tested against the similarly ordered valid bits by AND operators ("AND") 806. The unordered results R3, R0, R1 and R2 pass through result orderer 810 to obtain R0, R1, R2, and R3 as ordered prediction results, which is the form useable by prefetcher 100 and its elements that performing filtering, coherency, etc. By reordering valid bits and results (which can be just result bits), less hardware is necessary than reordering addresses each composed of a number of bits. Note that the orderings of orderer 702 and result orderer 810 are exemplary and other mappings to order and reorder bit are within the scope of the present invention.

According to a specific embodiment of the present invention, a suitable speculator 108 of FIG. 1, in whole or in part, is described in U.S. patent application Ser. No. 10/921,026 filed on Aug. 17, 2004, titled "System, Apparatus and Method for Predicting Accesses to a Memory", which is incorporated by reference in its entirety for all purposes. An example of a nonsequential predictor, according to one embodiment, suitable for implementation, in whole or in part, with multi-level cache 120, is described in U.S. patent application Ser. No. 10/920,682 filed on Aug. 17, 2004, titled "System, Apparatus and Method for Generating Nonsequential Predictions To Access A Memory", which is incorporated by reference in its entirety for all purposes. And according to at least one specific embodiment of the present invention, a suitable prediction inventory for implementing prediction inventory 116, in whole or in part, is described in U.S. patent application Ser. No. 10/920,610 filed on Aug. 17, 2004, titled "System, Apparatus and Method for Issuing Predictions from an Inventory to Access a Memory", which is incorporated by reference in its entirety for all purposes.

In a specific embodiment of the present invention, prefetcher 100 of FIG. 1, which includes nonsequential predictor 104 and multi-level cache 120, is disposed within a Northbridge-Southbridge chipset architecture, such as within a memory processor having at least some of the same functionalities of a Northbridge chip. A memory processor is designed to at least control memory accesses by one or more processors, such as CPUs, graphics processor units ("GPUs"), etc. In a Northbridge implementation, prefetcher 100 can also be coupled via an AGP/PCI Express interface to a GPU. Moreover, a front side bus ("FSB") can be used as a system bus between a processor and a memory. Also, a memory can be a system memory. Alternatively, multi-level cache 120 can be employed in any other structure, circuit, device, etc. serving to control accesses to memory, as does memory processor. Further, multi-level cache 120 and its elements, as well as other components of prefetcher 100, can be composed of either hardware or software modules, or both, and further can be distributed or combined in any manner.

The foregoing description, for purposes of explanation, used specific nomenclature to provide a thorough understanding of the invention. However, it will be apparent to one skilled in the art that specific details are not required in order to practice the invention. In fact, this description should not be read to limit any feature or aspect of the present invention to any embodiment; rather features and aspects of one embodiment may readily be interchanged with other embodiments. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A prefetcher for managing predictive accesses with a memory comprising:

a speculator configured to generate a range of predictions, said range of predictions including a range of predicted addresses;

a first cache configured to store predictions, at least one of which is addressable by a first representation of an address from said range of predictions;

a second cache configured to store predictions, at least one of which is addressable by a second representation of said address from said range of predictions, wherein said first representations and said second representations of said range of predictions are compared in parallel against said stored predictions of said first cache and said second cache, respectively;

a first matcher configured to compare said first representations against said stored predictions of said first cache, each of said first representations including a common portion and a delta portion; and a second matcher configured to compare said second representations against said stored predictions of said second cache, each of said second representations including a base portion, wherein said second matcher is configured to compare said base portion of an address of said range of predictions against said stored predictions of said second cache to form a group of unordered tag comparison results ("TCRs"), each of said unordered TCRs indicating whether said common portion for said address matches one of said common portions for said stored predictions; and an orderer configured to rearrange an order of valid bits to form a group of reordered valid bits for AND-ing against said group of unordered TCRs, thereby providing for ordered predictions.

2. The prefetcher of claim 1 wherein stored predictions in said first cache each has an age within a first age range and stored predictions in said second cache each has an age within a second age range.

3. The prefetcher of claim 1 wherein said second cache is configured to store more predictions than said first cache, said second representations each being adapted to compare against a larger number of predictions in parallel than each of said first representations.

4. The prefetcher of claim 1 wherein said first matcher and said second matcher are configured to match said range of predictions against said stored predictions that reside in the same page as said common portion and as said base portion, respectively, thereby conserving resources that otherwise would be required to match said range of predictions in two or more pages against stored predictions of said first and said second caches.

5. The prefetcher of claim 1 wherein said first matcher is configured to:
    compare said common portion of an address for at least one prediction of said range of predictions against a common address portion of said stored predictions of said first cache, and
    compare said delta portion of said address unique to each prediction of said range of predictions against said stored predictions in said first cache.

6. The prefetcher of claim 1 wherein said first cache is the only source of data for said second cache, said first cache storing said stored predictions up to a threshold of time after which said stored predictions are copied into said second cache.

7. The prefetcher of claim 6 further comprises at least one cache manager configured to compare one prediction of said stored predictions in said first cache against a write-back cache prior to copying said one prediction into said second cache, wherein said one prediction is not copied if a match is found in said write-back cache.

8. The prefetcher of claim 6 wherein said threshold varies during operation to either increase or decrease the rate at which any of said stored predictions of said first cache is copied into said second cache.

9. The prefetcher of claim 1 wherein said range of predictions includes two or more predictions.

10. The prefetcher of claim 1 wherein said first cache is configured to receive prefetched predictions from a memory and is further configured to copy said prefetch predictions into said second cache.

11. The prefetcher of claim 1 wherein said first and said second caches are configured to reduce latency with respect to a processor due to opening pages of a memory by storing nonsequential predictions as a subset of said range of predictions, said subset including predictions in two or more pages of memory, wherein said speculator generates said range of predictions in response to a trigger address, said trigger address being in a different page of memory than any page containing said range of predictions.

12. The prefetcher of claim 1 wherein said first and said second caches are configured to store a prediction identifier associated with each entry of said stored predictions and transmit said prediction identifier to said speculator.

13. The prefetcher of claim 1 wherein said second cache stores valid bits separately from each entry configured to store predictions.

* * * * *